Nov. 18, 1958 J. S. SENEY 2,861,159
RESISTANCE PROBE FOR LEVEL CONTROL
Filed Aug. 31, 1953 2 Sheets-Sheet 1
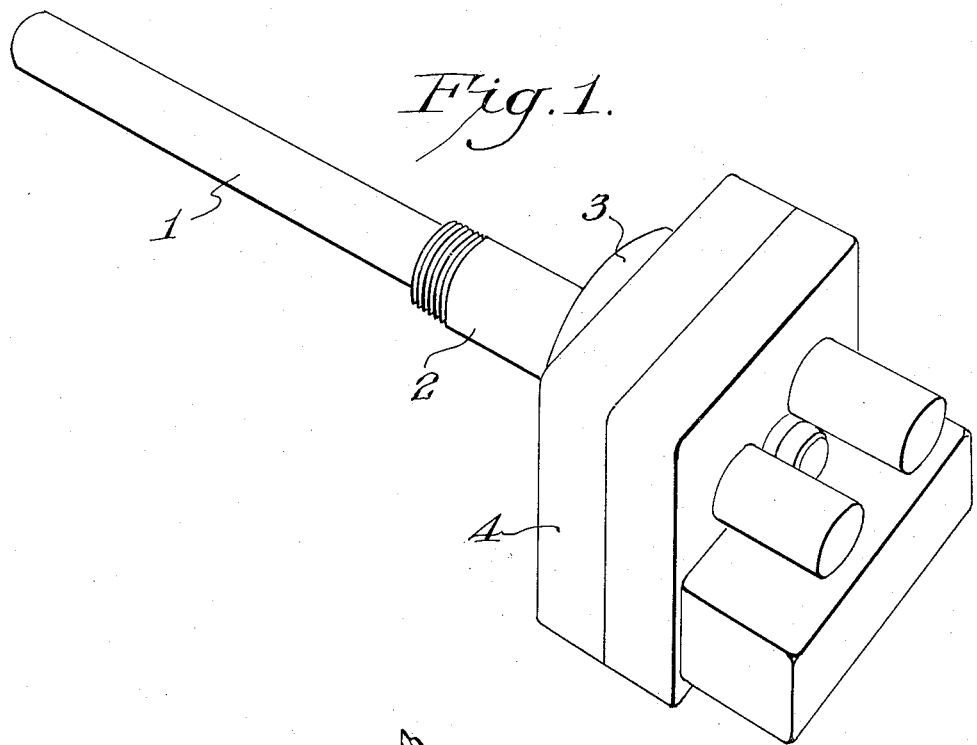
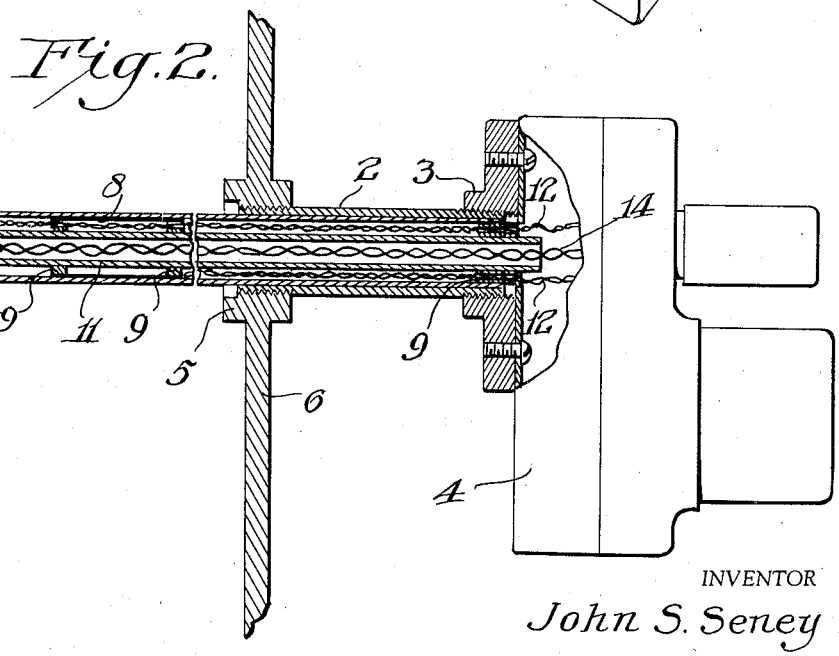
INVENTOR
John S. Seney
BY Charles A. McClure
ATTORNEY Nov. 18, 1958  J. S. SENEY  2,861,159
RESISTANCE PROBE FOR LEVEL CONTROL
Filed Aug. 31, 1953  2 Sheets-Sheet 2

INVENTOR
John S. Seney

BY Charles A. McClure
ATTORNEY

United States Patent Office 2,861,159
Patented Nov. 18, 1958

2,861,159

RESISTANCE PROBE FOR LEVEL CONTROL

John S. Seney, Henrico County, Va., assignor to E. I. du Pont de Nemours and Company, Wilmington, Del., a corporation of Delaware Application August 31, 1953, Serial No. 377,612

5 Claims. (Cl. 201—63)

This invention relates to the determination and control of a physical condition, such as the level of a liquid, and to novel apparatus useful for such purpose.

Containers of liquid may be sufficiently transparent to permit observation of the liquid level by energy transmission through the container wall, but whenever the wall is opaque to visible light, external sensing devices usually become so complicated that it is more convenient to sense the level from locations inside the container. Desirable features of an internal sensing device, particularly when the container is pressurized or evacuated, are simplicity of construction (preferably without moving parts, for dependability of operation and ease of maintenance), independence of temperature or pressure changes that may occur inside the container, and accurate, speedy response. If effective, a simple fixed or movable device having a localized sensing mechanism is preferable to dual or multiple sensing devices. The present invention concerns particularly the determination or control of liquid level or a similar condition by use of a temperature-sensitive probe and associated elements. The manner and means of accomplishing the above and other objectives will be apparent from the following description and the accompanying diagrams.

Figure 3:
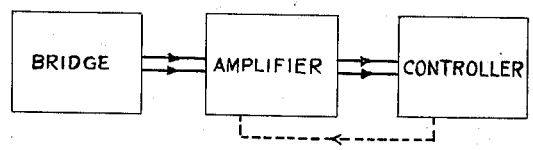
Figure 4:
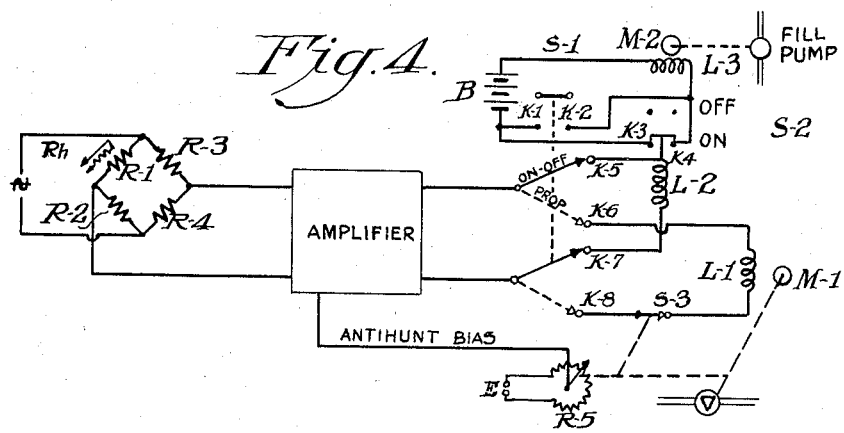
Figure 5:
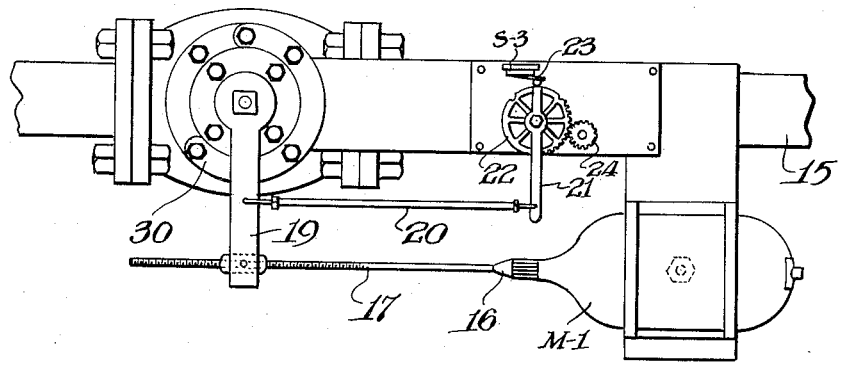

Figure 1 is a perspective view of the exterior of apparatus constructed according to this invention. Figure 2 is a side view, partly in section, of the apparatus of Figure 1 positioned for operation. Figure 3 is a block diagram of electrical components of apparatus of this invention. Figure 4 is a simplified schematic diagram of the electrical components of Figure 3. Figure 5 is a plan view of one form of control mechanism suitable for use according to this invention.

As suggested in Figure 3, the electrical apparatus of this invention includes three major components: a bridge, an amplifier, and a controller of some sort. The bridge or differential relay actuator includes the electrical elements of the probe. The structural design of a suitable probe is clear from the exterior view in Figure 1 and the sectional view in Figure 2. The following parts are included: cylindrical housing 1, open at one end, which may be made of any suitably heat-conducting material not attacked by the liquid whose level is to be measured; pipe 2 surrounding the housing from the open end for part of the housing length; flange 3, which threads onto the pipe at the open end of the housing; enclosed chassis 4 affixed by screws to the flange; fitting 5, welded into an opening in the tank wall 6 to receive the other end of the pipe, the probe housing extending on through the opening into the tank. Inside the housing are two similar coils 7 and 8 wound of wire having an appreciable, but not excessive, temperature coefficient of electrical conductivity; four annular washers 9 and solid washer 10; a hollow cylindrical tube 11 of material that is relatively nonconductive of heat and electricity; a pair of wires 12 leading out the open end of the probe housing from each of the coils, after passing through holes in washers 9 where necessary; and a heating cartridge 13 (details not shown) connected to a third pair of wires 14, which pass through the tube and out of the open end of the housing to connect with elements carried on the chassis. Caps for amplifier tubes and a sub-chassis are visible protruding from the body of the chassis.

As is clear from Figure 2, the cartridge enclosing the hidden heater element is slightly smaller in diameter than the tube so as to permit a press fit of an end of the cartridge into one end of the tube. The combined length of the tube and the protruding cartridge approximates the length of the probe housing. Coil 8 is mounted about midway of the tube, held centered on it by two annular washers fitting around the tube and inside the ends of the coil. Coil 7 is similarly held at one of its ends near the end of the tube, and this coil extends out around the heater cartridge. The other end of this coil is supported by a solid washer fitting inside the end of the coil and against the closed end of the housing when assembled. The diameter of the coils is sufficiently smaller than the internal diameter of the probe housing to allow the tube assembly carrying the cartridge and coils to fit snugly inside the housing. The tube is held centered at its end near the open end of the housing by an annular washer fitting around the tube and inside the housing. The coil wires run along inside the housing but outside the tube to leave the housing at the open end and connect into the bridge circuit.

The lengths of wire in the two coils 7 and 8 form bridge resistance elements R-1 and R-2, respectively, as shown schematically in Figure 4. The heater, which is located concentric with the probe axis just inside the closed end, is represented in the diagram as resistor R$h$ juxtaposed to R-1. Connection of this resistor at the arrows to a suitable source of electrical potential is understood. The other elements of the bridge are conveniently mounted on the chassis, along with the elements of an amplifier. They include two more resistors R-3 and R-4 to make up the other arms of the bridge, for which the indicated input alternating potential may be obtained from the usual commercial power line. While R-2 also conceivably could be located outside the probe, as in the attached chassis, location inside the probe housing (at a moderate distance from R-1 and R$h$) is greatly advantageous because then both R-1 and R-2 are exposed similarly to the ambient temperature inside the tank, which may be quite different from the outside temperature or may vary widely from time to time.

The temperature-sensitive coils should be in physical contact, as shown, with the probe housing to facilitate heat conduction between the coils and the medium surrounding the housing. This placing of the sensing elements is essential for rapid response of the device to changes in liquid level and for adequate compensation for changes in the ambient temperature inside the tank. Of course, sufficient electrical insulation of the wire to prevent shorting of the turns is necessary. Also important is the absence of any other appreciably heat-receptive mass near the coils; for example, the forms on which the coils are wound should be light to avoid absorbing an appreciable share of the available heat energy. Best results are obtained according to this invention by an integral construction of coil and form. A temporary support of suitable material, such as metal, is built up and covered with a thin sheet of solid polytetrafluoroethylene. The wire is wound carefully on this form, coated with a film-forming material, such as an acetone solution of cellulose acetate, and then the coil and polytetrafluoroethylene sheet are removed from the underlying support, after which the coil itself is separated carefully from the sheet. Further coating of film-forming plastic inside and out makes the coil thoroughly self-supporting. For best performance the mass of the wire in the coils should be minimized also. Good results have been obtained with 1000-ohm windings of Massey-Harris No. 99 wire (an enamel-covered nickel-copper alloy) having a diameter of 0.002 inch and a resistivity of about 12.6 ohms per foot.

As many designs of phase-discriminating amplifier are known to be capable of raising the bridge output to a sufficiently high level to operate a controller, the details of the amplifier are omitted for simplicity. A compact commercial design that has proved satisfactory is produced by the Brown Instruments Division of the Minneapolis-Honeywell Regulator Company under the trade name of "Moduflow Electronic Relay." Other suitable units of this general type are readily available, and the design of an amplifier as such forms no part of this invention. When very sensitive relay elements are used, the bridge may degenerate to a simple potential divider consisting of R–1 and R–2, or the amplifier may be simplified accordingly. With the materials mentioned a housing temperature differential of one-hundredth degree centigrade is sufficient to actuate the controller; the time required is only a few seconds.

The controller may comprise a simple solenoidal relay for an "on/off" type of control or a reversible motor for proportional control, or both types may be included as in Figure 4. Switch S–1, shown in the "on/off" position has an alternative setting (shown as PROP in dashed lines) for proportional operation. The setting of K–1 determines whether the amplifier output is applied to coil L–2 of relay S–2 through connections at contacts K–5 and K–7 or to coil L–1 of motor M–1 through connections at contacts K–6 and K–8. In the "on" position S–2 completes a circuit from battery B to coil L–3 of motor M–2 through contacts K–3 and K–4. Switch S–1 completes the same circuit through contacts K–1 and K–2 in the PROP position. Motor M–2 is shown connecting to a fill pump for the tank, and motor M–1 controlling a valve in the inlet line. With suitable polarity of connection either may affect an inlet or outlet valve or pump or other means of altering liquid level in a container.

A plan view of a motor drive for controlling the setting of a valve appears in Figure 5. Motor M–1, mounted horizontal on a vertical pivot above and to one side of pipe line 15, is a conventional type of drill motor with chuck 16 on the armature shaft. One end of threaded rod 17 is fixed in the chuck; the other end extends through a horizontally rotatable sleeve 18 held in the clevis of pivotable control arm 19 for valve 20, which is bolted in the pipe line. Adjustable link 20 extends from the control arm to another arm 21 affixed to gear 22 carried on a vertical pivot in approximately the same plane as the drill. Contacting the gear is roller 23 of limit switch S–3, and meshing with the gear is potentiometer drive gear 24 mounted on the shaft of resistor R–5, shown in Figure 4. Rotation of the gears adjusts the position of the arm of the resistor. The resistor is connected across a suitable potential source E, and its output is fed back to the amplifier to diminish the error signal.

Operation of the apparatus is quite simple. The probe may be inserted horizontally, as shown, through the wall of a container at a height at which the liquid level is to be maintained (or which it is not to exceed or not to drop below, as desired). Assume at first that the container is empty and that the level is desired to rise to the vicinity of the probe and to remain there despite fluctuation in the inlet or outlet rate. The electrical components of the apparatus are connected to a suitable power source with S–1 in the "on/off" position. Soon after the power is turned on, the heater rises in temperature sufficiently to make the coil located near it warmer than the coil farther away. The temperature differential between the coils is accompanied by a corresponding difference in their respective resistances; at increased temperature the conductivity of the heated coil becomes smaller. This unbalances the bridge to send an error signal to the amplifier, whose output actuates S–2 to the "on" position, whereupon the pump motor M–2 drives the pump to begin filling the container. When the liquid rises to the level of the probe housing, appreciable conduction of the heat into the liquid begins. The increased flow of heat away from the vicinity of the coil surrounding the heater cools the coil, decreasing its electrical resistance and consequently reducing the amount of error signal. When the change is sufficiently great, which may be preselected (as by adjusting the over-all amplification of the error signal or by changing the thermal gradient between the two temperature-sensitive coils) at about the time the liquid completely immerses the probe housing, the amplified error produces insufficient field in L–2 to hold S–2 closed, whereupon the circuit to the pump motor is interrupted as the switch releases to the "off" position. Until the liquid level falls sufficiently for the heated coil to become once more considerably hotter than the other coil the circuit will remain open. A constant rate of drainage from the tank would bring about intermittent switching between the "on" and "off" positions, with resulting slight fluctuation in the liquid level.

Proportional control can be employed by moving the controller switch from the "on/off" position to the PROP position. This closes the pump circuit, and control is provided by changes in the position of the motor-actuated valve in the supply line. When the level is too low, the error signal (suitably amplified) drives the motor to open the valve; when the level becomes higher, the motor reverses to close the valve, partly at first and eventually completely. Not only is the direction of the signal effective to close (or open) the valve as desired, but the amplitude of the signal determines the speed of the motor. For example, when the container is beginning to fill, the valve will be driven completely open, whereupon roller switch S–3 opens as roller 23 drops into an indentation in the potentiometer drive gear, interrupting the motor circuit to prevent damage to the mechanism. The roller switch limits the fully closed position similarly by opening when the roller falls into another indentation in the gear. As the liquid touches the probe housing reducing the temperature differential between the coils, the error signal will diminish in size and reverse in direction to reverse the motor and close the valve. In a continuous process where a constant flow through the container is desired, the equilibrium position of the valve would be partly open.

As the inertia of the moving mechanism is appreciable, it may be desirable to reduce the error signal before it normally becomes null, to prevent the valve from overshooting the desired position. Overshooting to any appreciable extent would continually reverse the direction of error signal so that the valve would swing back and forth about the equilibrium position. To prevent this hunting, a potentiometer (which may be a simple resistor or alternatively of the "selsyn" type) whose arm or rotor position is indicative of the position of the valve may be employed. This potentiometer may be connected to feedback to the amplifier a bias potential to decrease the amplifier response at about the half-open position of the valve, which is where the greatest hunting may be expected to occur and where its effects would be most objectionable. For more sensitive control a differentiating circuit or a tachometer generator may be employed, instead of the simpler potentiometer, to provide a potential indicative of the speed with which the valve position is being altered; this potential would be greatest when the rate of change in position is most rapid, thus keeping the movement of the system down sufficiently to prevent overshooting. Of course, a limiter may be placed in the feed-back line (for the antihunt) to clip excessively strong limiting signals that might prevent insufficiently rapid response at high errors. These principles are well understood by those skilled in the servomechanism art, and this mention is merely to suggest that refinements may be useful in adapting this invention to many different uses under widely varying conditions.

The apparatus described furnishes an easily amplified, stable alternating signal, thus avoiding the limitations of amplifiers for unidirectional signals. The temperature-sensitive coils respond rapidly and create a relatively large error signal as compared with the feeble response thermocouples would give in a similar application. The response is not dependent upon extraneous factors, and within reasonable limits it is practically unaffected by changes in temperature in the liquid whose level is being determined. The sensitivity of the system may be varied in many ways, as by changing the bridge resistances or by varying the size of the heating element. The probe may be mounted movably in the top of a tank so as to be raised and lowered by a motor actuated by the error output, if only an indication of the level is desired. Solid-liquid, solid-gas, and liquid-liquid interfaces may be located similarly under suitable conditions of sufficiently differing physical characteristics, e. g., heat conductivities, specific heats, or viscosities. Many adaptations of this apparatus will be apparent without a departure from the concept of the invention described.

What is claimed:

1. Apparatus comprising an elongated cylindrical heat-conductive housing carrying therein in thermally conductive, electrically non-conductive contact with the inside wall thereof two temperature-sensitive, electrically-conductive coils; a thermally and electrically non-conductive disc-shaped washer supporting the end of the first coil nearest the end of the housing and intervening therebetween; a thermally and electrically non-conductive tube centered in the housing and extending from within the other end of the first coil to the other end of the housing; a heater coil protruding from out of the end of the tube to a location within the first coil but out of contact therewith; a thermally and electrically non-conductive annular washer within and supporting the other end of the first coil about the heater coil; and a pair of thermally and electrically non-conductive annular washers surrounding the tube within each end of the second coil and in contact therewith; electrical leads from the coils passing outside the tube to the other end of the housing; and electrical leads from the heater coil passing inside the tube to the other end of the housing.

2. Probe apparatus comprising a heat conductive housing; at least a pair of resistance elements spaced longitudinally apart from each other adjacent the inside wall of the housing and sensitive to temperatures adjacent the outside of the housing; and a heating element within said housing located nearer to one of the resistance elements than to the other.

3. Probe apparatus comprising a heat conductive housing; a pair of resistance elements spaced longitudinally apart from each other adjacent the inside wall of the housing and sensitive to temperatures adjacent the outside of the housing; a pair of leads from the first of the pair of resistance elements adapted to connect with one arm of an electrical bridge circuit; a pair of leads from the second of the pair of resistance elements adapted to connect with another arm of the bridge; and a heating element within said housing located nearer to one of the resistance elements than to the other.

4. Probe apparatus comprising a cylindrical heat conductive housing; two cylindrical coils spaced longitudinally apart from each other adjacent the inside wall of the housing; sensitive to temperatures adjacent the outside of the housing and wound temperature-sensitive electrical conductors; a pair of leads from the first of the two coils adapted to connect with one arm of an electrical bridge circuit; a pair of leads from the second of the two coils adapted to connect with another arm of the bridge; a heating element within said housing located nearer to one of the two coils than to the other, each of said coils being in thermally conductive, electrically non-conductive contact with the heat conductive housing.

5. The probe apparatus of claim 4 wherein the two coils have a temperature coefficient of electrical conductivity.

References Cited in the file of this patent

UNITED STATES PATENTS

| 1,190,978 | Bliss | July 11, 1916 |
| 1,855,692 | Roller | Apr. 26, 1932 |
| 2,165,569 | Obermaier | July 11, 1939 |
| 2,263,055 | Smith | Nov. 18, 1941 |
| 2,304,211 | Sparrow | Dec. 8, 1942 |
| 2,632,885 | Barclay | Mar. 24, 1953 |

FOREIGN PATENTS

| 581,825 | Great Britain | Oct. 25, 1946 |